(12) United States Patent
Saifee et al.

(10) Patent No.: US 10,861,058 B2
(45) Date of Patent: *Dec. 8, 2020

(54) SYSTEM ARCHITECTURE AND METHODS FOR FACILITATING CLIENT-SIDE REAL-TIME AUCTIONS OF ADVERTISING INVENTORY

(71) Applicant: OpenX Technologies, Inc., Pasadena, CA (US)

(72) Inventors: Qasim Saifee, Pasadena, CA (US); Bin Shen, Pasadena, CA (US); Brian Schmidt, Pasadena, CA (US); Jarriett Robinson, Pasadena, CA (US); David Tannenbaum, Pasadena, CA (US); Vadim Telyatnikov, Pasadena, CA (US)

(73) Assignee: OpenX Technologies, Inc., Pasadena, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/997,559

(22) Filed: Jun. 4, 2018

(65) Prior Publication Data

US 2018/0285938 A1    Oct. 4, 2018

Related U.S. Application Data

(63) Continuation of application No. 14/461,265, filed on Aug. 15, 2014, now Pat. No. 9,990,656, which is a (Continued)

(51) Int. Cl.
*G06Q 30/02* (2012.01)

(52) U.S. Cl.
CPC ..... *G06Q 30/0275* (2013.01); *G06Q 30/0261* (2013.01); *G06Q 30/0277* (2013.01)

(58) Field of Classification Search
CPC .......... G06Q 30/0275; G06Q 30/0277; G06Q 30/0261
See application file for complete search history.

(56) References Cited

U.S. PATENT DOCUMENTS

| 7,296,033 B1 | 11/2007 | Lynch |
| 8,255,285 B1 | 8/2012 | Peretz et al. |

(Continued)

OTHER PUBLICATIONS

International Search Report and Written Opinion, PCT/US2014/051376, dated Feb. 11, 2015 (17 pages).

*Primary Examiner* — Mario C. Iosif
(74) *Attorney, Agent, or Firm* — Patent Law Works LLP

(57) ABSTRACT

System architecture and methods for enabling a client-side real-time auction of advertising inventory that works in conjunction with ad serving technologies. The method according to some embodiments of the present invention comprise: (i) an end-user visiting a web page wherein multiple advertisements are displayed, (ii) for each ad unit on the page, multiple parallel requests are sent from the end-user's browser client to multiple real-time bidders who respond with a bid & advertisement for each unit, (iii) the bids are compared within the end-user's browser and the winning bid is sent to an ad serving system to be compared with other statically priced advertisements and exchange demand to determine the winning advertisements that will be displayed to the end-user and (iv) data is aggregated for each bid and price limits are set based on the aggregations.

20 Claims, 14 Drawing Sheets

Related U.S. Application Data continuation-in-part of application No. 14/461,186, filed on Aug. 15, 2014, now Pat. No. 10,614,490.

(60) Provisional application No. 61/866,998, filed on Aug. 16, 2013, provisional application No. 61/866,439, filed on Aug. 15, 2013, provisional application No. 62/009,297, filed on Jun. 8, 2014.

(56) References Cited

U.S. PATENT DOCUMENTS

| | | | |
|---|---|---|---|
| 8,438,184 B1 | 5/2013 | Wang et al. | |
| 9,053,492 B1 * | 6/2015 | Stanley | G06Q 30/0224 |
| 2003/0212648 A1 | 11/2003 | Cunningham et al. | |
| 2007/0011050 A1 | 1/2007 | Klopf et al. | |
| 2008/0162329 A1 * | 7/2008 | Knapp | G06Q 30/02 |
| | | | 705/37 |
| 2009/0204541 A1 | 8/2009 | Zhuk et al. | |
| 2009/0234713 A1 * | 9/2009 | Bi | G06Q 30/08 |
| | | | 705/14.54 |
| 2010/0241511 A1 * | 9/2010 | Cunningham | G06Q 30/02 |
| | | | 705/14.46 |
| 2011/0173126 A1 | 7/2011 | Knapp et al. | |
| 2011/0185016 A1 | 7/2011 | Kandasamy et al. | |
| 2011/0270689 A1 | 11/2011 | Klopf et al. | |
| 2011/0282751 A1 | 11/2011 | Kwon et al. | |
| 2012/0036023 A1 | 2/2012 | Das et al. | |
| 2012/0136873 A1 | 5/2012 | Shaffer et al. | |
| 2013/0073401 A1 * | 3/2013 | Cook | G06F 3/0482 |
| | | | 705/14.73 |
| 2013/0080264 A1 | 3/2013 | Umeda | |
| 2013/0124357 A1 | 5/2013 | He et al. | |
| 2013/0138514 A1 | 5/2013 | Yan et al. | |
| 2013/0163428 A1 | 6/2013 | Lee et al. | |
| 2013/0191439 A1 * | 7/2013 | Kern | G06F 16/986 |
| | | | 709/203 |
| 2013/0339139 A1 | 12/2013 | Meyers et al. | |
| 2014/0033228 A1 * | 1/2014 | Lucash | G06Q 30/0241 |
| | | | 719/313 |
| 2014/0188630 A1 | 7/2014 | Balazs et al. | |
| 2014/0223462 A1 | 8/2014 | Aimone et al. | |

\* cited by examiner

SYSTEM ARCHITECTURE AND METHODS FOR FACILITATING CLIENT-SIDE REAL-TIME AUCTIONS OF ADVERTISING INVENTORY

CROSS REFERENCE TO RELATED APPLICATIONS

This application is a continuation of and claims priority under 35 USC § 120 to U.S. patent application Ser. No. 14/461,265, titled "System Architecture and Methods for Facilitating Client-Side Real-Time Auctions of Advertising Inventory" filed Aug. 15, 2014, now issued as U.S. Pat. No. 9,990,656, which is a continuation-in-part of U.S. application Ser. No. 14/461,186, titled "Integrated Architecture for Performing Online Advertising Allocations," filed on Aug. 15, 2014, now issued as U.S. Pat. No. 10,614,490; further U.S. application Ser. No. 14,461,265 claims priority under 35 USC § 119(e) to U.S. Provisional Application Serial No. 61/866,998, titled "System Architecture and Methods For Facilitating Client-Side Real-Time Auctions of Advertising Inventory" filed Aug. 16, 2013, and U.S. application Ser. No. 14/461,186 claims priority under 35 USC § 119(e) to U.S. Provisional Application Serial No. 61/866,439, titled "System and Methods for Deterministically Rendering Defaulting Advertisement Chains," filed on Aug. 15, 2013, and U.S. Provisional Application Serial No. 62/009,297, titled "System and Methods for Demand Fusion and Predictive Pricing," filed on Jun. 8, 2014, the entireties of all of which applications are herein incorporated by reference.

BACKGROUND

1. Field of the Invention

The present invention relates generally to the field of digital media display advertising. In particular, the present invention relates to system architecture and methods for facilitating client-side real-time auctions of advertising inventory.

2. Description of the Related Art

With the popularity and use of the Internet, web browsers and sites providing content have grown dramatically over the past decade. With this growth there has been an equally dramatic growth and migration to online advertising. However, online advertising presents a complex eco-system involving a complicated interplay between several entities, including online publishers (an example of a first-party entity), online advertisers (both, informed and uninformed, other examples of a first-party entity), and users (examples of first-party entities) who typically browse the internet or use mobile applications to view all types of content.

An advertisement displayed in the web content or on a mobile application is often in the form of an arbitrary string of HTML called a "creative." The advertisement is displayed by adding a "creative" to the current web page or application in which the advertisement is to be displayed in the appropriate location. In the simplest case, the creative may contain an image or "Flash" element representing what is ultimately visible to the user on his or her user device as the advertisement. In some instances, the creative may also represent code or the HTML for a third-party advertisement ("ad") tag.

In instances when a "creative" is added to the web page, a notification otherwise referred to as the "impression" is sent back to the advertisement server to confirm that the advertisement has been displayed. It should be recognized that the term "impression" also generally refers to the event in which a user views a slot into which an advertisement can be served, along with any contextual information that could inform the advertisement selection process. In such scenarios, "impressions" are what advertisers are ultimately interested in purchasing from web publishers.

Typically, digital advertising supply, or "inventory," refers to the impressions that website publishers have made available for advertisers to purchase. Impressions are eventually associated with advertisement units, which are the physical spaces on web pages or mobile applications reserved for displaying advertisements.

Online or digital advertising typically uses modeling platforms (examples of third-party entities) that use these impressions, impression values (intrinsic, i.e., value to an "advertiser" and value to a "publisher" of content), estimated impression values, and inventory of content. Impression values include intrinsic values, which are values to advertisers and publishers. Estimated impression values include values to publishers and advertisers (both informed and uninformed).

Because advertising on the internet has become a very large industry, advertisers are interested in targeting very specific individuals who are most likely to engage with their product. Advertisers are often looking to target specific users who match certain demographics and/or have visited certain web sites or purchased specific items. In order to reach those specific users, advertisers utilize real-time bidders (third-party platforms) and exchanges (third-party platforms), which have access to large amounts of inventory so they can find those specific users. Presently most real-time bidders gain access to publisher inventory indirectly, through these exchanges or through server-side requests (examples of third-party platforms). The ability to make multiple requests to several real-time bidders directly from the client and have them compete with their other non-real-time inventory is beneficial to the publisher as it creates additional competition and accomplishes higher overall pricing for their inventory.

As a related consideration, several third-party platforms exist that provide advertisement software as a service and serve as ad servers. Some of these third-party ad server platforms are configured for use by small publishers and others are scaled for use by large publishers. Such third-party ad server platforms provide a myriad features to provide ad-management solutions that help publishers either sell, schedule, deliver, or measure their digital ad inventory, and optimize their revenue. In operations of third-party platforms, a webmaster typically inserts a tag or code into a webpage. In some instances, each time this page is visited, the code calls an advertisement server, which delivers an advertisement from its source of vendors. In some instances, the code may create an IFrame, and then the third-party platform determines which campaign wins and then delivers the creative (one or a group of creatives) to the IFrame. In many instances, inline Javascript tags are used instead. Such platforms enable growing publishers to operate quickly, while providing access to a sophisticated feature set to manage and deliver advertising across a publisher's web, mobile, and video ad inventory.

In one example scenario, a publisher may define its advertisement inventory to a third-party ad server. For example, the platform may take a publisher's home page and cut out all of the advertisement space. These empty spaces that are identified define the publisher's advertisement inventory and represent what the publisher can sell to advertisers. Ad servers permit the publisher to sell the ad inventory directly to advertisers, by confirming the number of advertisement impressions or clicks that are available to sell. These third-party platforms also offer inventory forecasting. Using these third-party platforms, publishers can manage their own campaigns and in the event advertisers have specific campaign goals, add in additional delivery and targeting options such as geography, day and time, or custom targeting criteria that is defined by the publishers. For any inventory that is not sold by the publisher, the platform may utilize tools to ensure that the publisher always has an opportunity to earn the most revenue from its content. After uploading "creative" (for example, either one or a group of "creative"), the platform delivers a publisher's ads. The platform may be configured with infrastructure and intelligent ad-delivery engines to help ensure that campaigns deliver on schedule and meet their campaign goals. Once a particular publisher's advertisements start delivering, a particular publisher may monitor their performance with ease.

There are other ad server platforms that provide other features including a single interface to track all activities, eliminating the frustrations typically experienced by publishers who have to toggle back and forth between different systems. These platforms can track multiple campaigns for multiple clients across multiple digital marketing channels through a single, powerful gateway. A publisher may obtain real-time statistics on campaign performance, from clicks to conversions, e-commerce sales, and more. Such platforms are configured to partner with other ad platforms and networks. These platforms offer a more reliable infrastructure, a flexible API, custom solutions, and consulting services. Some ad servers interface with one or more ad exchanges that allow publishers seamlessly to manage their inventory, and sell the inventory directly through the associated ad exchange. A publisher, however, cannot know whether the prices bid by advertisers in such an associated ad exchange is the highest and best price available for any given ad impression. If publishers could accurately assess the market value of an impression before sending the impression to an ad exchange associated with their ad server, they could use such information to set a minimum price for bids in the associated ad exchange, thereby ensuring that they receive the highest and best price for each impression.

Therefore, a need continues to exist in the art for better systems and methods configured to provide better solutions and increased revenue.

SUMMARY

The present invention overcomes the deficiencies and limitations of prior systems and methods, at least in part by, providing a system and methods configured to enable or operate a client-side auction with several real-time bidders before the system communicates with an advertisement exchange associated with their ad server. In some implementations, the results of the client-side auction are then communicated to the ad-serving system using key/value pairs and campaign targeting so that the ad-serving system can operate its own auction between the real-time bidders and the non-real time inventory. By soliciting bids from one or more third party sources, publishers can evaluate the market value of a given ad impression before delivering it to an ad exchange associated with their ad server. By using this value as a minimum price that the publisher will accept, bidders in the associated ad exchange will be required to exceed the minimum price in order to win the right to have their ad delivered. This system ensures accurate and competitive pricing and bidding for a publisher's inventory, thereby increasing the publisher's revenue and yield.

In some implementations, a publisher may send a request to one or more third parties, including ad exchanges where a real-time auction results in a winning bid, or demand side platforms, ad networks, or other sources of potential demand for ad impressions. In advance, the third-party platforms may have set up campaigns for a range of prices. A publisher may then use the prices such demand sources are willing to pay as a minimum price delivered to another ad exchange. In many implementations, these initial auctions or expressions of price interest may result in a higher price to the publisher as multiple parties bid on the request. This integrated architecture for multiple third-party platforms creates a more competitive market for each request, resulting in increased revenue for publishers.

The method according to some embodiments of the present invention comprise: (i) an end-user visiting a web page wherein multiple advertisements are displayed, (ii) for each ad unit on the page, multiple parallel requests are sent from the end-user's browser client to multiple real-time bidders who respond with a bid & advertisement for each unit, (iii) the bids are compared within the end-user's browser and the winning bid is sent to an ad serving system to be compared with other statically priced advertisements and exchange demand to determine the winning advertisements that will be displayed to the end-user and (iv) data is aggregated for each bid and price limits are set based on the aggregations.

BRIEF DESCRIPTION OF THE DRAWINGS

The present invention is illustrated by way of example, and not by way of limitation in the figures of the accompanying drawings in which like reference numerals are used to refer to the same or similar elements.

Figure 1:
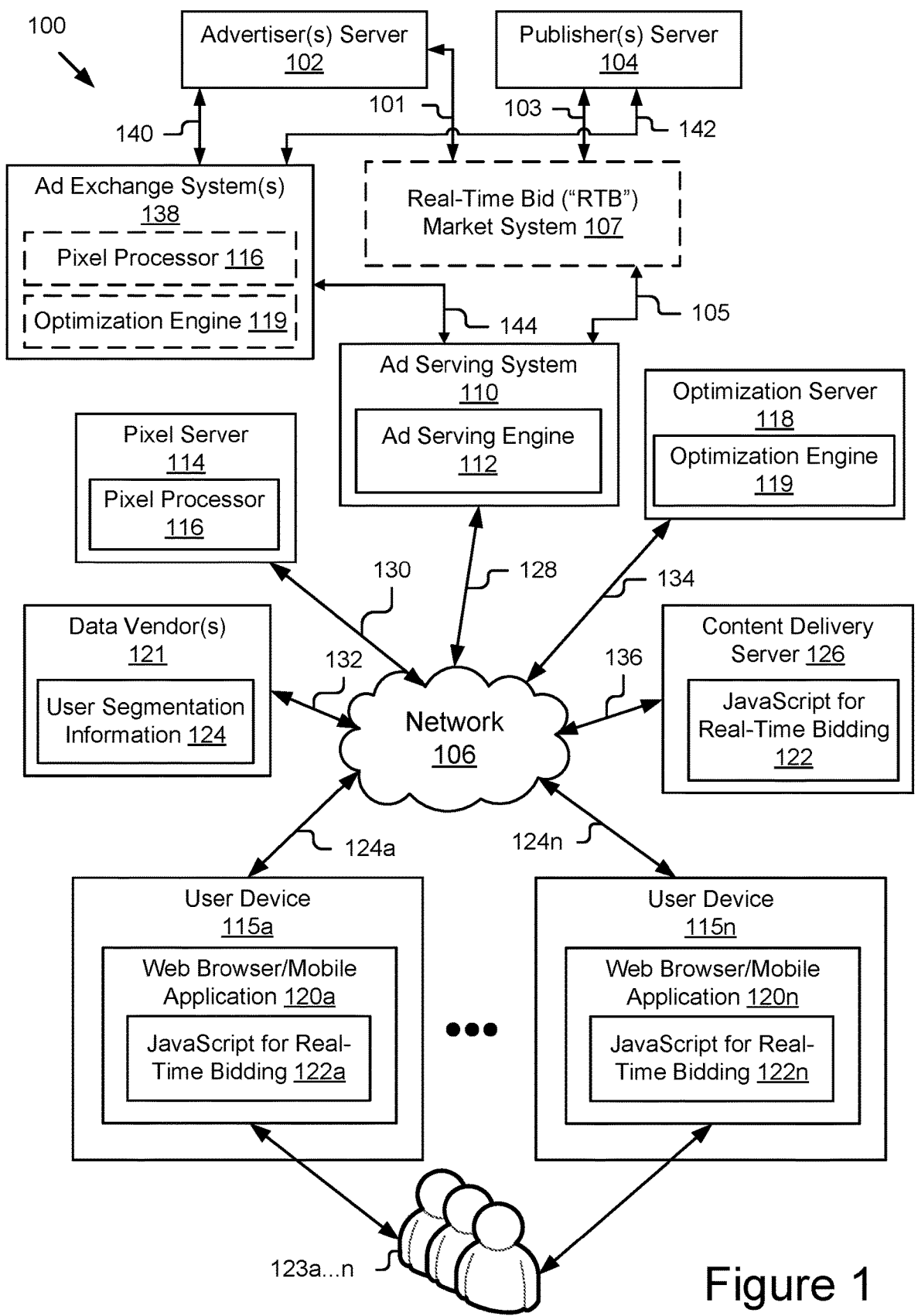
FIG. 1 illustrates a block diagram of an example client-side real-time auction network architecture in accordance with some embodiments of the present invention.

It is to be understood that the attached drawings are for purposes of illustrating the concepts of the invention and may not be to scale, and are not intended to be limiting in terms of the range of possible shapes and/or proportions.

DETAILED DESCRIPTION

A system architecture and methods configured to enable or operate a client-side auction with several real-time bidders before the system communicates with, for example, places a call to an advertisement exchange. In some implementations, the results of the client-side auction are then communicated to the ad-serving system using key/value pairs and campaign targeting so that the ad-serving system can operate its own auction between the real-time bidders and the non-real time inventory.

In some implementations, a publisher may send a request to a third-party market platform, where a first real-time auction results in a winning bid. Before this winning advertisement ("ad") is served, that price may be sent to one or more other third-party platforms (also configured to perform other real-time auctions, a second, third, and so on). In advance, the third-party platforms may have set up campaigns for a range of prices. In many implementations, these additional auctions may result in a higher price to the publisher as parties within these other third-party platform also bid on the request. This integrated architecture for multiple third-party platforms creates a more competitive market for each request, resulting in increased revenue for publishers.

In the following description, for purposes of explanation, numerous specific details are set forth in order to provide a thorough understanding of this technology. It will be apparent, however, that this technology can be practiced without some of these specific details. In other instances, structures and devices are shown in block diagram form in order to avoid obscuring the innovative aspects. For example, the present technology is described in some implementations below with reference to particular hardware and software.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present technology can take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

Each computer in the system may include one or more input and output (I/O) unit, a memory system, and one or more processing units. The input-output ("I/O") units of each computer may be connected to various input/output devices, such as a mouse, keyboard, video card (video monitor), sound card (with speakers), network card, and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

System Overview

According to some embodiment of the present invention system architecture for conducting client-side auctions are illustrated. For purposes of the description, some definitions are provided here. A "pixel" refers to a 1×1 pixel image file in any standard browser image format (e.g., gif, jpg, png). A "web worker" refers to an HTML five threaded process that runs asynchronously and can pass messages/events back to main page. A key/value pair refers to data expressed as a tuple <attribute name, value>. For example: <david, male>. "Segmentation data" refers to data describing a user's demographics and preferences used for targeting advertisements. For example, considering a user's gender, income level, etc. "JSON" (Javascript Object Notation) means a lightweight text-based open standard designed for human-readable data interchange. It is derived from the Javascript scripting language for representing simple data structures, called objects.

Referring now to FIG. 1, the system architecture illustrated includes an Advertiser(s) Server 102, a Publisher(s) Server 104, Real-Time Bid Market System 107, a Pixel Server 114 (with an pixel processor 116), an Ad Serving System 110 (with an Ad Serving Engine 112), an Optimization Server 118 (with an Optimization Engine 119), Data Vendor(s) 121 (with User Segmentation Information 124), a Content Delivery Server 126 (with JavaScript for Real-Time Bidding 127), one or more Ad Exchange Systems 138, and a plurality of user devices 115a through 115n, each with a web browser 120a through 120n (and the JavaSript for Real-Time Bidding 122a through 122n).

The advertiser server 102 may be an online or digital advertiser server or website 102 (representing one or more online or digital advertisers). In the context of the present disclosure, an advertiser is any individual, group of people, company, or any other enterprise, that desires to have advertisements embedded in the content of other publishers. The online or digital advertiser server 102 may be a computing system (with one or more computers or processors, either linked or distributed) that submits bids to the Real-Time Bid ("RTB") Market Platform 107 (shown in broken lines as in some advertising scenarios this may be omitted or the functionalities may be incorporated in other platforms) to purchase publisher inventory and have advertiser advertisements shown on the publisher's website. The online or digital advertiser server 102 is illustrated as coupled to the RTB market platform 107 via signal line 101 and the online or digital publisher content server 104 is illustrated as coupled to the RTB market platform 107 via signal line 103. In some embodiments, the computing system may comprise one or more processors coupled in a distributed environment or otherwise to execute operational functionalities associated with the Advertiser(s) servers.

The online or digital publisher content server 104 may be a computing system that maintains online or digital content that attracts users and contains placeholders for advertisements (from the advertisement inventory) that are submitted to the RTB market system 107, for sale to advertisers. A content publisher that places content on publisher content server 104 may be an individual, a group of people, a company, or any other enterprise that owns or controls content that is made accessible for viewing via the publisher content server 104. A content publisher utilizes the publisher content server to serve content (e.g., web pages) to the user devices 115a through 115n of an Internet user. For instance, in some embodiments, the publisher content server 104 is a web server or application server that serves Internet documents or web pages encoded in a mark-up language (e.g., HTML) that can be rendered by the web browser 120a through 120n application executing on the user devices 115a through 115n, for display to an Internet user. Accordingly, the web pages served by the publisher server 104 may be thought of as the publisher's inventory. Each time a web page is served, an opportunity exists to display one or more advertisements embedded within the web page. Skilled artisans generally refer to this opportunity, that is, the presentation of a web page with a display advertisement, as a page impression, or simply an impression. Accordingly, the terms "ad space" and "impression" are often used synonymously with the term "inventory" to indicate what it is that is being offered for sale or viewing by the publisher.

The RTB Market System 107 may be a computing system that provides a real-time bidding market that allows advertisers to bid on publisher inventory in real-time. While only a single advertiser server 102, a single publisher content server 104 and a single network 106 are shown in FIG. 1, it should be recognized that there may be thousands or even millions of advertiser servers 102, publisher content servers 104, or networks 106 interconnected in complex architecture configurations to execute the operations and functionalities described here. FIG. 1 is merely provided as one example illustration of the Advertiser (s) Server 102, Publisher(s) Server 104, and Network 106, which present the environment in which the present technology may be implemented.

The Advertiser(s) Server 102 is coupled by signal line 101 for communication with the Real-Time Bid Market System 107. Although not explicitly shown in FIG. 1, it should be recognized that any and all the signal lines illustrated in FIG. 1 may route, via the network 106, as illustrated in FIG. 1. The Advertiser(s) Server 102 is coupled to the Real-Time Bid Market System 107 to send bids on impressions, and also provides advertisement content, advertising target information, price, or any other information related to the impression or necessary to serve the advertisement. The RTB Market System 107 illustrates a real-time bidding market environment, which allows advertisers to bid on publisher inventory in real-time.

The online Publisher Server or content site 104 is a computing device for hosting a website with any type of content for publishing. The signal line 103 provides information to the RTB Market System 107 about which impressions on the publisher's site are available for the RTB Market System 107. The bi-directional signals line 102 and 103 (from the RTB 107) to the Advertiser(s) Server 102 and Publisher(s) Server 104 represent the flow of data.

The RTB Market System 107 is coupled by signal line 105 to an Ad Serving System 110, which is configured to serve the advertisements. The advertisement server 110 may be hardware and software that receives requests for advertisement units, submits, and then fulfills those requests with online content. The advertisement server 110 is coupled to the Network 106 for communication and interaction with the Advertiser Server(s) 102 and/or the Publisher(s) Server 104. In some embodiments, the Ad Serving System 110 is also coupled to interact directly with the user devices 115a . . . 115n as depicted in FIG. 1, by signals lines 128 and 124a (connecting the Ad Serving System 110 to the User Device 115a) through signal lines 128 and 124n (connecting the Ad Serving System 110 to the user device 115n). The Ad Serving System 110 is coupled to one or more Ad Exchange Systems 138 via line 144. And, the one or more Ad Exchanges are coupled to the Ad Server(s) 102 via line 140. In some implementations, the Ad Serving System 110 may send the bid(s) to the one or more Ad Exchanges 138 for further processing. An Ad Exchange 138 may be hardware and software that receives the bids and further processes them as described in the flow charts below. Each of the one or more Ad Exchange Systems 138 may include the Optimization Engine 119 and Pixel Processor 116 to carry out the functionalities as described here.

The Network 106 may be of a conventional type, wired or wireless, and may have any number of configurations such as a star configuration, token ring configuration or other configurations known to those skilled in the art. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The Pixel Server 114 with Pixel Processor 116 delivers pixel image files in any standard browser image format (e.g., gif, jpg, png). The pixel processor 116 aggregates this data for reporting and for price threshold analysis. The Optimization Server 118 with Optimization Engine 119 takes this data and determines minimum pricing thresholds and writes this to the JavaScript code that is downloaded by the client at the beginning of the process. Data Vendor(s) 121 may provide User Segmentation Information 124 and Content Delivery Server 126 provides the JavaScript for Real-Time Bidding.

The client (alternatively referred to as a consumer, user, or viewer) device, referenced in the drawings as User Device 115a is representative of client devices 115a-115n and is a conventional type of computing device, for example, a personal computer, a hardware server, a laptop computer, a tablet computer, or smart phone. The User Devices 115a-115n, are illustrated, as coupled to the network 106. In one embodiment, the User Device 115 (e.g., 115a) is coupled to receive online advertisements from the Advertisement Serving System 110 directly and/or receive content from publishing sites such as the Publisher(s) Server 104 via the network 106. The User Device or client device 115 (e.g., 115a) includes a web browser 120a for presenting online content and advertisements to a user (not shown) using any of the user devices 115a through 115n. The web browser 120a is configured to provide access to a hosted web page. The web page may comprise a main area in which content is displayed and an advertisement. In some instances, the advertisement may be contained within an iframe.

As illustrated in FIG. 1, the web browser 120a may include scripts configured to perform the functionalities. In some implementations, a JavaScript configured for Real-Time Bidding 122a may be located in the browser 120a through 120n. The JavaScript 122a through 122n may be configured to facilitate Real-Time bidding by clients.

In one example, an end-user (e.g., client) may visit a website located at a specific URL using an internet browser 120a, such as Internet Explorer or Mozilla Firefox. The browser 120a renders HTML (Hypertext markup language) code that requests a JavaScript file 122a be loaded from a content delivery network. The JavaScript file 122a contains code that enables multiple parallel requests to be made to several real-time bidders for each advertisement slot on a web page. The JavaScript code 122a is configured to prevent continuous loading of the advertisements on the web page until either a certain time has elapsed or until all the bidders have responded. The JavaScript code 122a then determines the winning bid for each advertisement slot. In some instances, the JavaScript code 122a may also be configured to contain historical pricing information by number of requests for each advertisement slot and for particular user segments as determined by the Data Vendors 121. In some implementations, the winning bid may be compared against these historical values to determine if it reaches a minimum threshold. In scenarios where the threshold is met, a key/value pair is set for each winning bid that is sent to the Ad Serving System 110. The Ad Serving System 110 contains many campaigns targeted to key/values pairs to run the real-time advertisements. The Ad Serving System 110 determines if the winning bid generated from the real-time auction wins against fixed priced inventory. If the real-time bidder wins, then code is written to the web page to display the real-time winning bid advertisement.

In some implementations a pixel may be written to the web page that calls the Pixel Server 114. Appended to the pixel is information pertaining to the number of requests the user made to reach the bid and more detailed information about the user as determined by the Data Vendor(s) 121. The Pixel Processor 116 aggregates this data for reporting and for price threshold analysis. In some implementations, the Optimization Engine 119 takes this data and determines minimum pricing thresholds and writes this to the JavaScript code 122a that may be downloaded by the user or client at the beginning of the process.

Figure 2A:
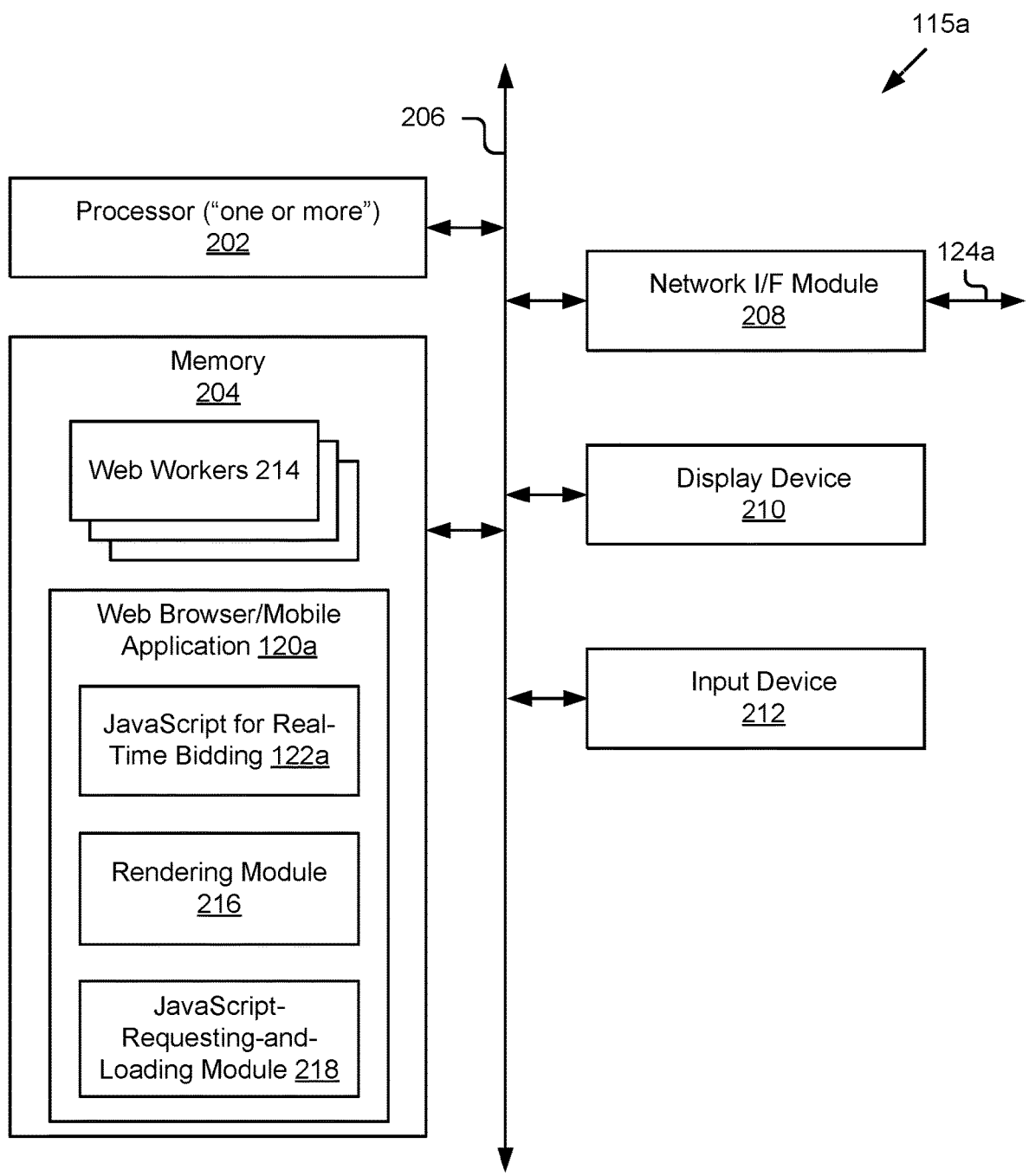
FIG. 2A illustrates a block diagram of an example client (or consumer or user) device configuration to facilitate real time bidding in accordance with some embodiments of the present invention.

Referring now to FIG. 2A, the user device (any of 115a through 115n) may be a conventional computer, for example, a personal computer that is used to represent a conventional type of mobile computing device, for example, cellular telephones, tablet devices, or wearable devices, each using a computing device or a computing device connected to an actual mobile device. The user devices 115a-115n, are coupled to the network 106 (e.g., an ad network) by signal lines 124a-124n (FIG. 1), respectively. In one embodiment, the user device 115a is coupled to receive (e.g., download or otherwise view) content with online advertisements from the Advertiser(s) server 102 and other content from publishing sites (e.g., Publisher Server(s)) or third party servers (not shown) coupled in the illustrated distributed environment.

The user device 115a through 115n may comprise a processor or one or more processors, indicated by reference numeral 202, a memory 204, a network I/F module 208, a display device 210, and an input device 212. The user devices 115a through 115n include the web browser 120a (in the Memory 204) for presenting web pages including online content and advertisements to the user, consumer, or client for viewing on their respective user devices 115a-115n. The web browser 120a on each of the user devices 115a-115n presents advertisements and other online content, and receives input from the user as represented by signal lines 124a-n. Users may interact via their respective devices 115a-115n (e.g., for viewing or manipulating tools to receive or control viewing of the online content). The web browser 120a-n and the scripts resident on the user devices 115a-115n are operable on the user devices 115a through 115n. In some implementations, the scripts may include a JavaSript for Real-Time Bidding 122a. The web browser 120a (through 120n) may also include a Rendering Module 216 and a JavaScript Requesting and Loading Module 218.

The Processor 202 processes data signals and program instructions received from the Memory 204. The processor 202 may comprise various computing architectures including a complex instruction set computer (CISC) architecture, a reduced instruction set computer (RISC) architecture, or an architecture implementing a combination of instruction sets.

The memory 204 is non-transitory storage medium. The memory 204 stores the instructions and/or data which may be executed by the processor 202. In some embodiments, the instructions and/or data stored on the memory 204 comprises code for performing any and/or all of the techniques described herein. The memory 204 may be a dynamic random access memory (DRAM) device, a static random access memory (SRAM) device, flash memory or some other memory device known in the art. The memory 204 includes the web browser 120a including various scripts that enhance the functionality of the client-side bidding operations. In some implementations, the memory stores the web browser 120 with the Javascript for real-time bidding indicated by reference numeral 122a. In some implementations, the memory 204 stores the web browser 120a with the JavaScript for implementing the real-time bidding operations. In some implementations, the memory 204 stores the web browser 120a with the Javascript for conducting the real-time bidding operations.

The network I/F module 208 facilitates the communication between the user device 115a and the servers via the network 106. A user, via the user device 115a, communicates with the other servers in the system 100 (FIG. 1) via the network I/F module 208.

The display device 210 displays the content or web pages that a particular user is viewing and the input device 212 serves as the input to the display device 210.

According to an embodiment of the present invention and referring to FIGS. 1 and 2A, an end-user (e.g. via User Device 115a) visits a web page with one or more ad units on the page. Javascript is loaded on the page that spawns multiple iframes or web workers 214 (FIG. 2A) that make parallel requests to several real-time bidders. The web page pauses loading of advertisements for a configured amount of time, for example milliseconds or in some instances until all bids are received. After time has elapsed or all bidders have responded, the winner is determined. In some implementations, the winning bid is compared against price floors by segment and sent to the ad server (e.g., Ad Serving System 110). The price floors are determined by analyzing the segmentation data along with each bid and storing the mean value of the bid minus a standard deviation in a JSON array that gets downloaded by the client and compared to the winning bid.

Figure 2B:
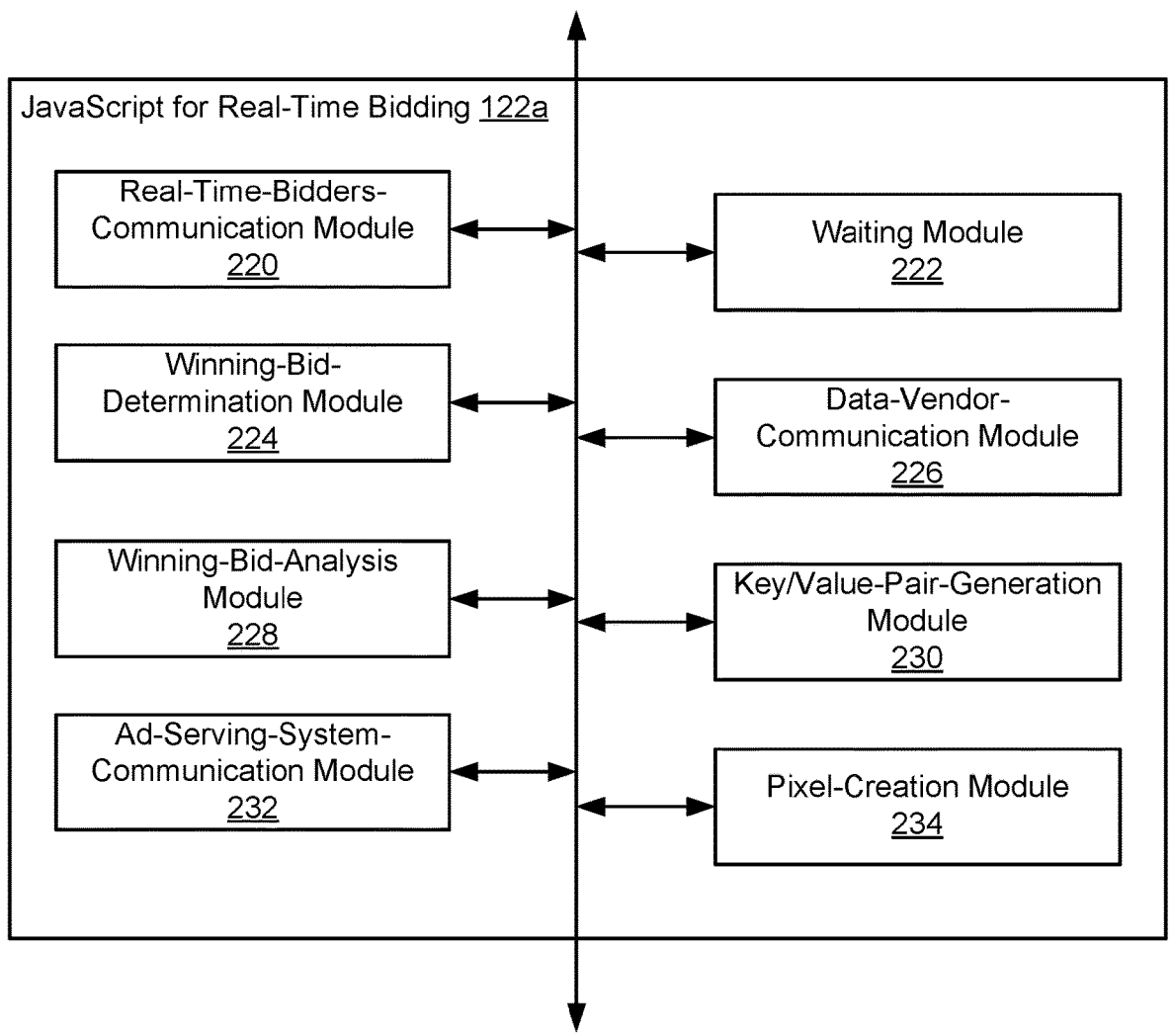
FIG. 2B illustrates a block diagram of an example code (e.g., JavaScript) to facilitate the real time bidding.

Referring now to FIG. 2B, the JavaScript for Real-Time Bidding 122a includes various modules, among which as examples some modules are described. The JavaScript for Real-Time Bidding 122a includes a Real-Time Bidders Communication Module 220, a Waiting Module 222, a Winning Bid Determination Module 224, a Data Vendor Communication Module 226, a Winning Bid Analysis Module 228, a Key/Value Pair Generation Module 230, an Ad Serving System Communication Module 232, and a Pixel Creation Module 234.

Figure 3A:
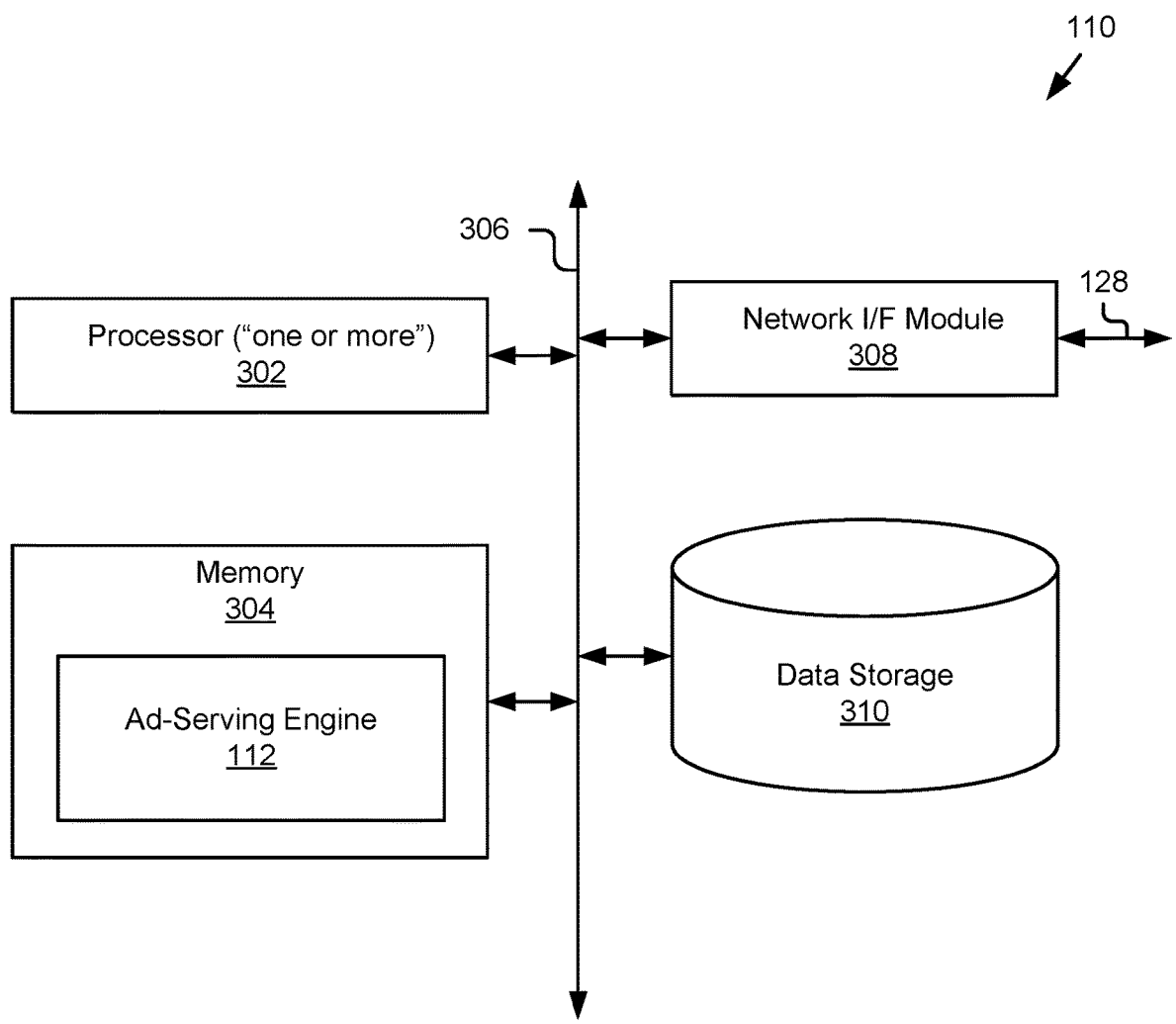
FIG. 3A illustrates a block diagram of an example advertisement serving system in accordance with some embodiments of the present invention.

Referring now to FIG. 3A, the Ad Serving System 110 is described. In some implementations, the Advertisement Server 110 may include one or more processors 302, a memory 304 with an Ad Serving Engine 112, a network I/F module 308 and storage 310. The processor 302 processes data signals and program instruction received from the memory 304. The processor 302 may comprise various computing architectures including a complex instruction set computer (CISC) architecture, a reduced instruction set computer (RISC) architecture, or an architecture implementing a combination of instruction sets.

The memory 304 is non-transitory storage medium. The memory 304 stores the instructions and/or data which may be executed by the processor 302. In some embodiments, the instructions and/or data stored on the memory 304 comprises code for performing any and/or all of the techniques described herein. The memory 304 may be a dynamic random access memory (DRAM) device, a static random access memory (SRAM) device, flash memory or some other memory device known in the art. The memory 304 includes the Ad Serving Engine 312 for implementing the enhanced features. The network I/F module 308 facilitates the communications between all the components over the bus 206.

The data storage 310 stores the data and program instructions that may be executed by the processor 302. In some embodiments, the data storage 310 includes a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

Figure 3B:
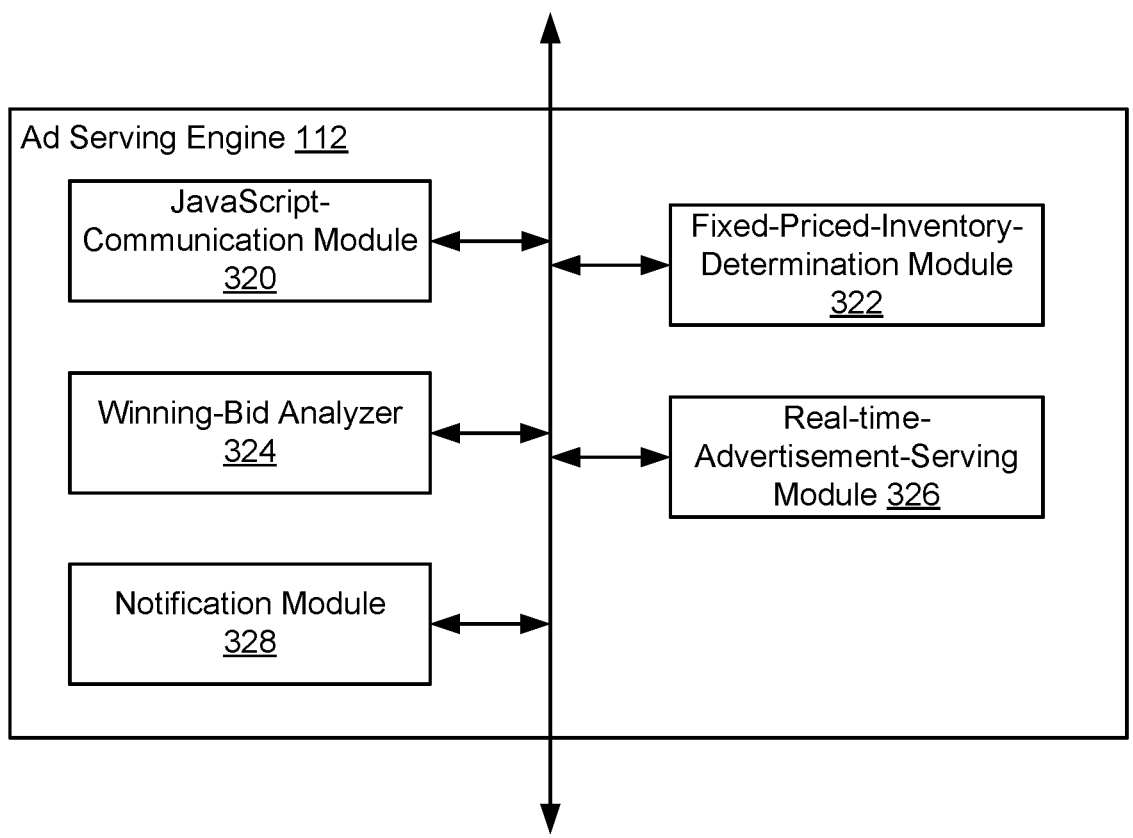
FIG. 3B illustrates an example Advertisement ("Ad") Serving Engine in accordance with some embodiments of the present invention.

Referring now to FIG. 3B, the Ad Serving Engine 112 is illustrated and described. The Ad Serving Engine 112 includes a JavaScript Communication module 320, a Fixed Price Inventory Determination Module 322, a Winning Bid Analyzer 324, a Real-time Advertisement Serving Module 326, and a Notification Module 328. In some implementations, the JavaScript communication module 220 may be software including routines for facilitating communications. In some implementations, the JavaScript communication module 320 may be a set of instructions executable by the processor 302 to provide the functionality for generating and managing communications. In other implementations, the JavaScript communication module 320 may be stored in the memory 304 (FIG. 3A) and may be accessible and executable by the processor 302 (FIG. 3A). In either implementation, JavaScript communication module 320 may be adapted for cooperation and communication with the processor 302, data storage 310 and other components via the bus 306 (3A).

The Fixed Priced Inventory Determination Module 322 determines a fixed price. In some implementations, the Fixed Priced Inventory Determination Module 322 may be software including routines for determining fixed pricing. In some implementations, the Fixed Priced Inventory Determination Module 322 may be a set of instructions executable by the processor 302 (FIG. 3A) to provide the functionality for determining fixed pricing. In other implementations, the Fixed Priced Inventory Determination Module 322 may be stored in the memory 304 (FIG. 3A) and may be accessible and executable by the processor 302 (FIG. 3A). In either implementation, Fixed Priced Inventory Determination Module 322 may be adapted for cooperation and communication with the processor 302, data storage 310 and other components via the bus 306 (FIG. 3A).

The Winning Bid Analyzer 324 analyzes the winning bid. In some implementations, the Winning Bid Analyzer 324 may be software including routines for analyzing the winning bid. In some implementations, the Winning Bid Analyzer 324 may be a set of instructions executable by the processor 302 (FIG. 3A) to provide the functionality for analyzing the winning bid. In other implementations, the Winning Bid Analyzer 324 may be stored in the memory 304 (FIG. 3A) and may be accessible and executable by the processor 302 (FIG. 3A). In either implementation, the Winning Bid Analyzer 324 may be adapted for cooperation and communication with the processor 302, data storage 310 and other components via the bus 306 (FIG. 3A).

The Real-time Advertisement Serving Module 326 serves the winning advertisement in real time. In some implementations, the Real-time Advertisement Serving Module 326 may be software including routines for serving the advertisement in real time. In some implementations, the Real-time Advertisement Serving Module 326 may be a set of instructions executable by the processor 302 (FIG. 3A) to provide the functionality for serving the advertisement in real time. In other implementations, the Real-time Advertisement Serving Module 326 may be stored in the memory 304 (FIG. 3A) and may be accessible and executable by the processor 302 (FIG. 3A). In either implementation, Real-time Advertisement Serving Module 326 may be adapted for cooperation and communication with the processor 302, data storage 310 and other components via the bus 306 (FIG. 3A).

The Notification Module 328 provides notifications. In some implementations, the Notification Module 328 may be software including routines handling ad requests. In some implementations, the Notification Module 328 may be a set of instructions executable by the processor 302 (FIG. 3A) to provide the functionality for providing notifications. In other implementations, the Notification Module 328 may be stored in the memory 304 (FIG. 3A) and may be accessible and executable by the processor 302 (FIG. 3A). In either implementation, the Notification Module 328 may be adapted for cooperation and communication with the processor 302, data storage 310 and other components via the bus 306 (FIG. 3A).

According to an embodiment of the present invention and referring to FIGS. 2 and 3, an end-user (e.g., via User Device 115a) visits a web page. The web page requests that javascript be loaded from the Content Delivery Server 126 (FIG. 1). The javascript creates multiple workers (FIG. 2A) or iframes that make simultaneous parallel requests to real-time bidders for each ad slot. The bidders respond with a JSON object that contains information about their winning bid and advertisement for each slot. The system then updates information about the winning bids in the browser cookie along with segmentation data using a pixel (FIG. 1). In some instances, the system sends all the prices on the Ad Server 102. In some implementations, the system may check winning bids against segment data (e.g., User Segmentation Information 124) for the user to determine if the bid meets a pre-determined pricing threshold for the user segment. If the winning bid is acceptable, the bid is passed to the Ad Server 102 using a key/value pair. The Ad Server 102 compares the winning bid against inventory present in the Ad Server 102 and the winning advertisement may be selected. If the real-time bidder wins, a javascript code is passed back from the Ad Server 102 to the web page to render the advertisement stored within the page. Also, the user cookie is updated with information about the winning bidder.

According to an embodiment of the present invention, for each user request the system checks the cookie to determine if current segmentation data provided by data providers is available. If no current segmentation data is available, the system can request this data from the applicable data vendors by rendering a javascript tag in the web page. The winning bid is retrieved from the parallel client-side auction. The system writes a pixel to the page that describes information about the winning bid and segmentation data provided by the data vendors. The data is aggregated and pricing thresholds are determined for each segment for future real-time bidder requests. The pricing thresholds are updated in a javascript file for each site and are downloaded by the client before requests are made.

In operation, this system architecture facilitates multiple requests to multiple bidders. In order to make multiple requests to multiple bidders, embodiments of the present invention utilize web workers 214 (FIG. 2A), if available from within the client browser (e.g., 120a). If web workers 214 are not available, embodiments of the present invention can use hidden iframes to make multiple requests and return values by calling a function in the parent browser window. First, the website publisher sets the site and ad unit name from within the header of the web page. Such page headers are used to lookup the identifications ("ids") & sizes of the various ad units within the web page. Using these parameters, the system downloads a JSON specific for the site that contains mappings between each ad unit and their associated ids for each real-time bidder. This object also contains information regarding size of the ad unit and callback functions. Second, each URL necessary to make a call to the associated real-time bidding platform is assembled using the lookup:

EXAMPLE URLS http://www.rtb1.com/rtb?id=12345&size=300×250&flash=1&cookies=1&callback=300×250_1&referrer=refferrer
http://www.rtb2.com/rtb?id=23456&size=300×250&flash=1&cookies=1&callback=300×250_1&referrer=refferrer In some implementations, a new web worker or iframe may be created for each RTB URL. The web worker 214 asynchronously retrieves the bid and advertisement from the bidder and returns it to the main thread. In the event the browser does not support the web workers 214, the system is configured to use iframes to make each individual call. This is accomplished by programmatically creating an iframe for each RTB call and writing a script tag to the iframe. The information is retrieved by calling a javascript function in the main page from the iframe.

In some implementations during the period in which bid requests are being made to bidders, the system makes requests to data providers (e.g., Data Vendor(s) 121) to return detailed segmentation data on the user (e.g. User Segmentation Information 124). This information is stored in a cookie so that in future requests for this user there is no need to make an additional call to the data provider.

In some implementations, the main thread waits until it has received a response from each worker or iframe. After the main thread has either received a response or reached the max time, it determines the maximum bid response received. The maximum bid response value is measured against the value for the data segment and a decision is made whether to pass the bid to the adserver or not. The data segmentation information is retrieved and updated in JSON format. The system determines segment pricing using an algorithm that looks at mean prices by user segment. If the bid received is a set percentage below the average bids received for the user's segmentation than the bid is rejected. The data is gathered by writing a pixel along with the winning ad with bid & segment information.

In some implementations, a set of campaigns are created in the Ad Server(s) 102 for each bidder associated to the key/value pairs. The system creates one or more keys for the maximum number of advertisements of a specific size for placement on a single page of the web site. By way of example, if a site has a maximum of five ads on one page then the system generates five unique keys. In some instances, only one key may be required. The system then traffics/creates campaigns in the Ad Server(s) 102 for each bidder and assigns them to each key. In the above example, the Ad Server(s) 102 key would be KEY1 and the value would be rtb1_size_order_bid where rtb1 is the name of the real-time bidder, size is the size of the ad slot, and order is the numerical position of the ad on the page and bid represents the nominal value of the rtb1's returned bid. The numerical position is necessary because a page might contain more than one ad of the same size.

In some implementations, for each campaign set-up in the system, the system traffics a "creative" (or a group of "creative") that calls the associated URL stored in the web page. In the above example, the system sets the returned URL from the bid request in the web page as ad[rtb1_size_order]. In the associated "creative" (or group of "creative") the system renders this to the page using javascript that renders the stored variable in the page.

The system also appends another script to the "creative" (or a group of "creative") that renders a pixel in the browser and makes a request to the system's servers. The winning bid and any information from data providers are sent as a pixel request to the system's server. The system utilizes this information to make intelligent decisions regarding the value of different user segments and for reporting purposes. The value of each user segment is the calculated mean of all the requests made to the server. The system then calculates a standard deviation of the requests and this value is used to determine the threshold minimum value for specific user requests.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

Methods and Algorithms for Conducting Client-Side Bidding

Figure 4:
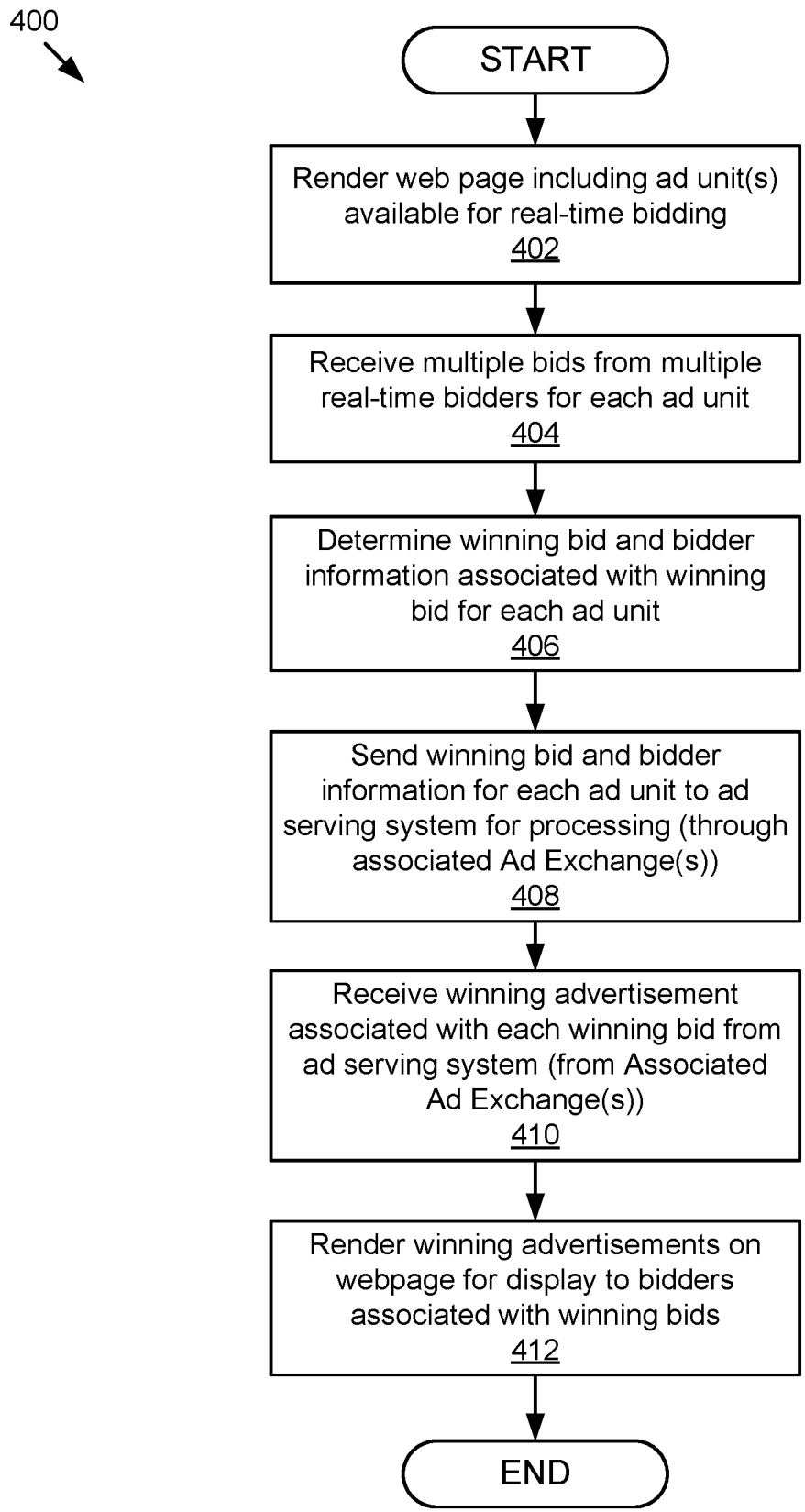
FIG. 4 illustrates a flow chart of an example process for conducting a client-side real-time auction in accordance with some embodiments of the present invention.

Referring now to FIG. 4, the process for conducting client-side real-time auctions are described, as indicated by reference numeral 400. The process 400 may begin and proceed to block 402, including one or more operations for rendering a web page including advertisement units that are available for real-time bidding. The process 400 proceeds to the next block 404, including one or more operations for receiving multiple bids from multiple real-time bidders or each advertisement unit. The process 400 proceeds to the next block 406 including one or more operations for determining winning bids and bidder information associated with winning bids for each advertisement unit. The process 400 proceeds to the next block 408 including one or more operations for sending the winning bid and bidder information for each advertisement unit to the Advertising Serving System 110 for processing (through the associated one or more Ad Exchanges 138). The process 400 proceeds to the next block 410 including one or more operations for receiving winning advertisements associated with each winning bid from the Advertisement Serving System 110 (through the associated one or more Ad Exchanges). The process 400 proceeds to the next block 412, including one or more operations for rendering the winning advertisements on the web page for display to the bidders associated with the winning bids.

FIGS. 5A through 5D represent a continuous flowchart of a specific method 500 for conducting client-side real-time auctions. The method 500 begins and proceeds to block 502, including one or more operations for rendering a web page including advertisement unit(s) available for real-time bidding. The method 500 proceeds to block 504 including one or more operations for requesting JavaScript for initiating real-time bidding. The method 500 proceeds to the next block 506, including one or more operations for loading the JavaScript for the real-time bidding. The method 500 proceeds to the next block 508 including one or more operations for sending multiple parallel requests to multiple real-time bidders (including associated one or more ad exchanges 138) for advertisement unit, by using web workers (e.g. web workers 214 in FIG. 2A). From there, the method 500 proceeds to the next block 510 including one or more operations for receiving bids and desired advertisements for each advertisement unit from multiple real-time bidders. The method 500 proceeds to the next block 512 including one or more operations for waiting for a pre-determined time or until all the bidders' responses are received. The method 500 proceeds to the next decision block 514 including one or more operations for determining if the pre-determined time has passed, lapsed or completed and if all the responses are received. If the answer is negative, the method 500 returns to block 512 for waiting until the time period has lapsed. If the answer is affirmative, the method 500 continues via connector "A" to the next block 516 in FIG. 5B including one or more operations for determining a winning bid for each advertisement unit. The method 500 proceeds to the next block 518 including one or more operations for requesting historical pricing information by a number of requests for an advertisement unit and user segmentation information from data vendors (e.g., at Data Vendor(s) sites 121). The method 500 proceeds to the next block 520 including one or more operations for receiving historical pricing information for each advertisement unit and user segmentation information for the bidder associated with the winning bid from the data vendors. The method 500 proceeds to the next block 522 including one or more operations for determining for the winning bid whether the bid satisfies the minimum pricing threshold based on the historical pricing information and user segmentation information. The method 500 proceeds to the next decision block 524 including one or more operations for making a determination if the bid satisfies a minimum pricing threshold. If the answer is negative, the process 500 continues to a next block 526 including one or more operations for determining the next winning bid for each advertisement unit and then returns to block 522 to continue the loop. If the answer is affirmative, the process 500 proceeds to the next block 528 including one or more operations for generating and setting key/value pairs for the winning bids, wherein the key/value pair describes the bidder's and bidding information associated with the winning bid. The method 500 proceeds via connection "B" to the next 5C.

Figure 5A:
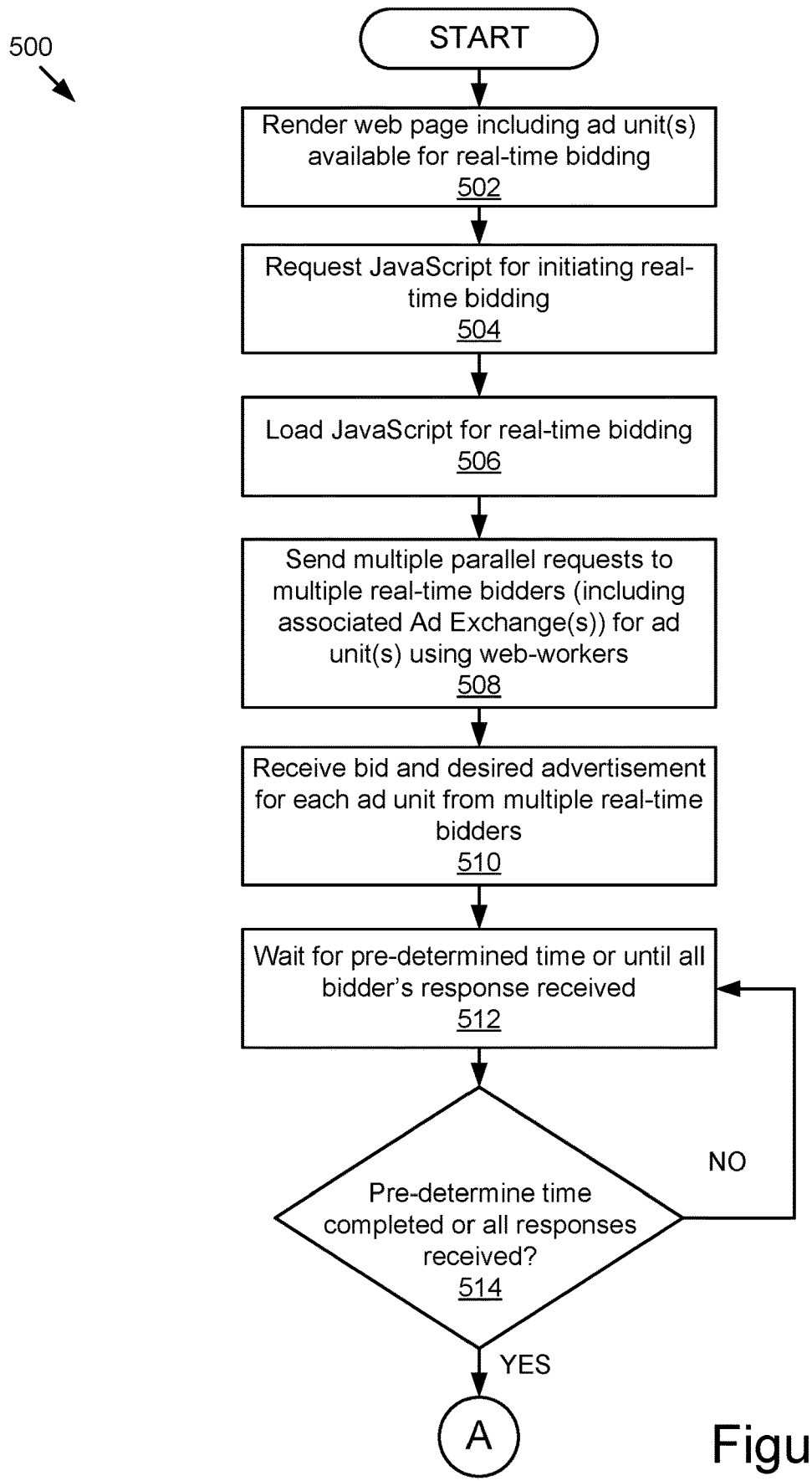
FIGS. 5A-5D together illustrates a flowchart of a specific method for real-time bidding for one or more advertisement units by multiple real-time bidders.
Figure 5B:
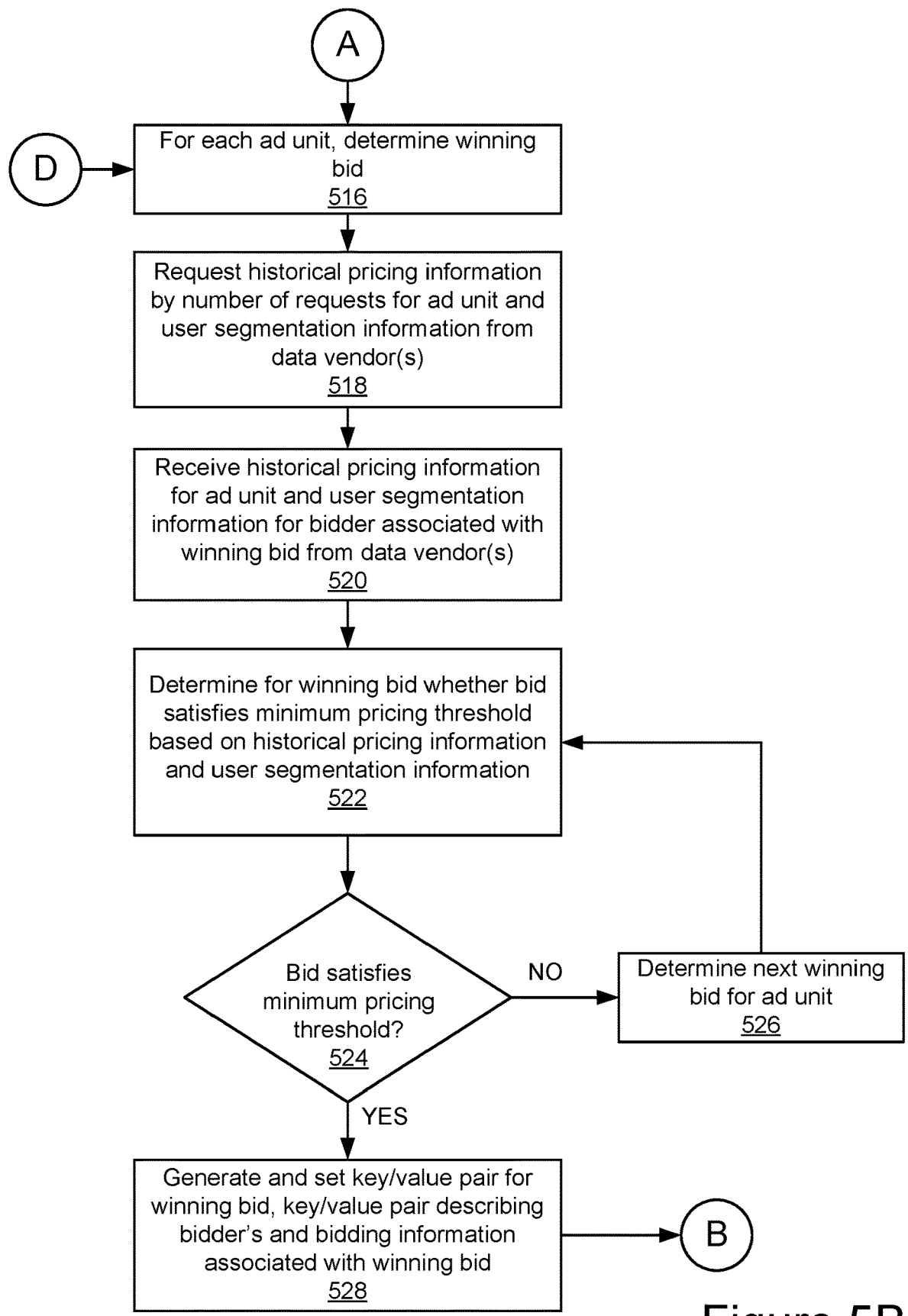
Figure 5C:
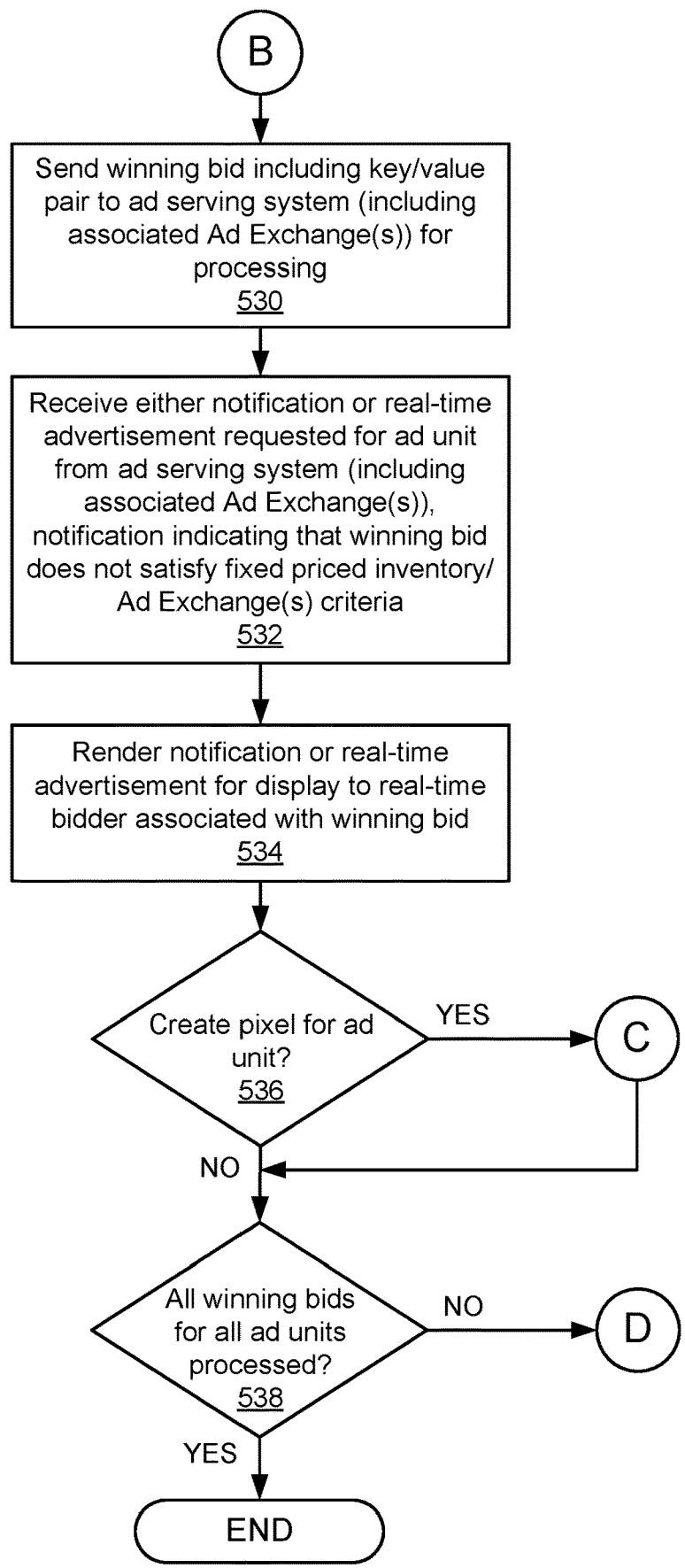

Referring now to FIG. 5C, the method 500 proceeds to block 530 including one or more operations for sending winning bids including key/value pairs to the Ad Serving System 110 for processing (through associated one or more Ad Exchanges 138). In some instances, the one or more Ad Exchanges 138 may be configured as part of the Ad Serving System in a distributed or other architecture. The method 500 proceeds to the next block 532 including one or more operations for receiving either a notification or real-time advertisements from the Ad Serving System 110 (including associated one or more ad exchanges) requested for each advertisement unit, wherein the notification indicates that the winning bid does not satisfy fixed price inventory or one or more ad exchange criteria. The method 500 proceeds to the next block 534 including one or more operations for rendering notification or real-time advertisements for display to real-time bidders associated with the winning bid. From there, the method 500 proceeds to the next decision block 536 including one or more operations for determining if a pixel for the advertisement unit should be created. If the answer is affirmative, the method 500 proceeds to a connector "C," which presents an option of either continuing at block 540 in FIG. 5D or continues to another decision block 538 (FIG. 5C). If the answer at decision block 536 is negative, the method 500 continues to the decision block 538, where a determination is made to decide if all the winning bids for all the advertisement units have been processed. If the answer is negative, the process 500 continues to connector "D" and through it returns to block 516 (in FIG. 5B), where the process 500 determines the winning bid for each advertisement unit. If the answer at decision block 538 is affirmative, the process 500 continues to an end.

Figure 5D:
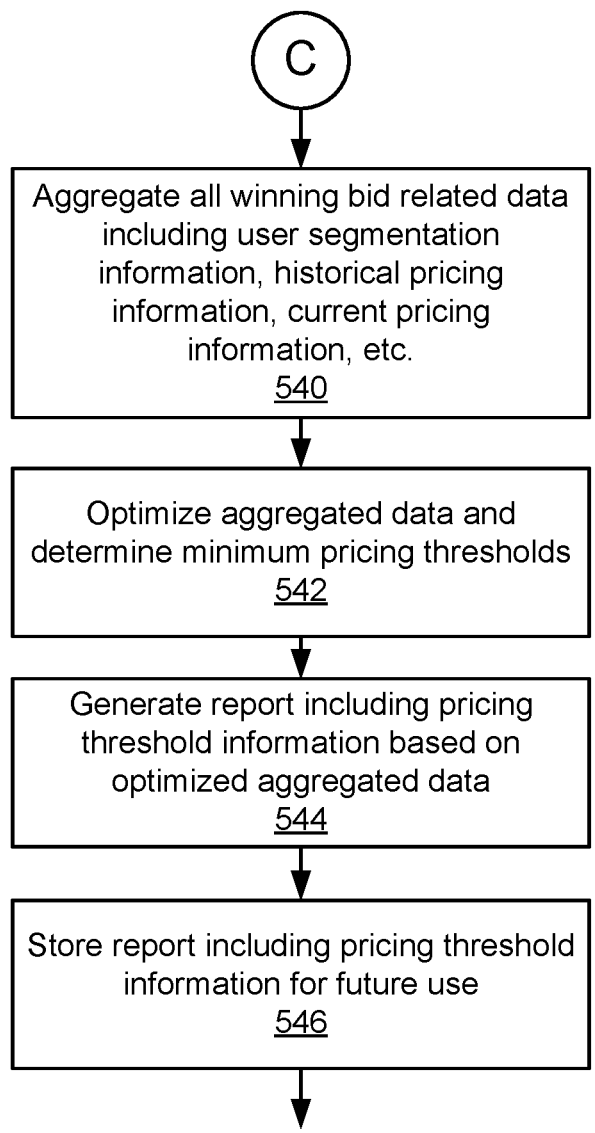

Referring now to FIG. 5D, via connector "C," the method 500 proceeds to the next block 540 including one or more operations for aggregating all winning bids related data including user segmentation information, historical pricing information, and current pricing information, etc. The method 500 proceeds to the next block 542 including one or more operations for optimizing aggregated data and determining minimum pricing thresholds. The method 500 proceeds to the next block 544 including one or more operations for generating a report including pricing threshold information based on the optimized aggregated data. The method 500 proceeds to the next block 546 for storing the report including pricing threshold information for future use.

Figure 6A:
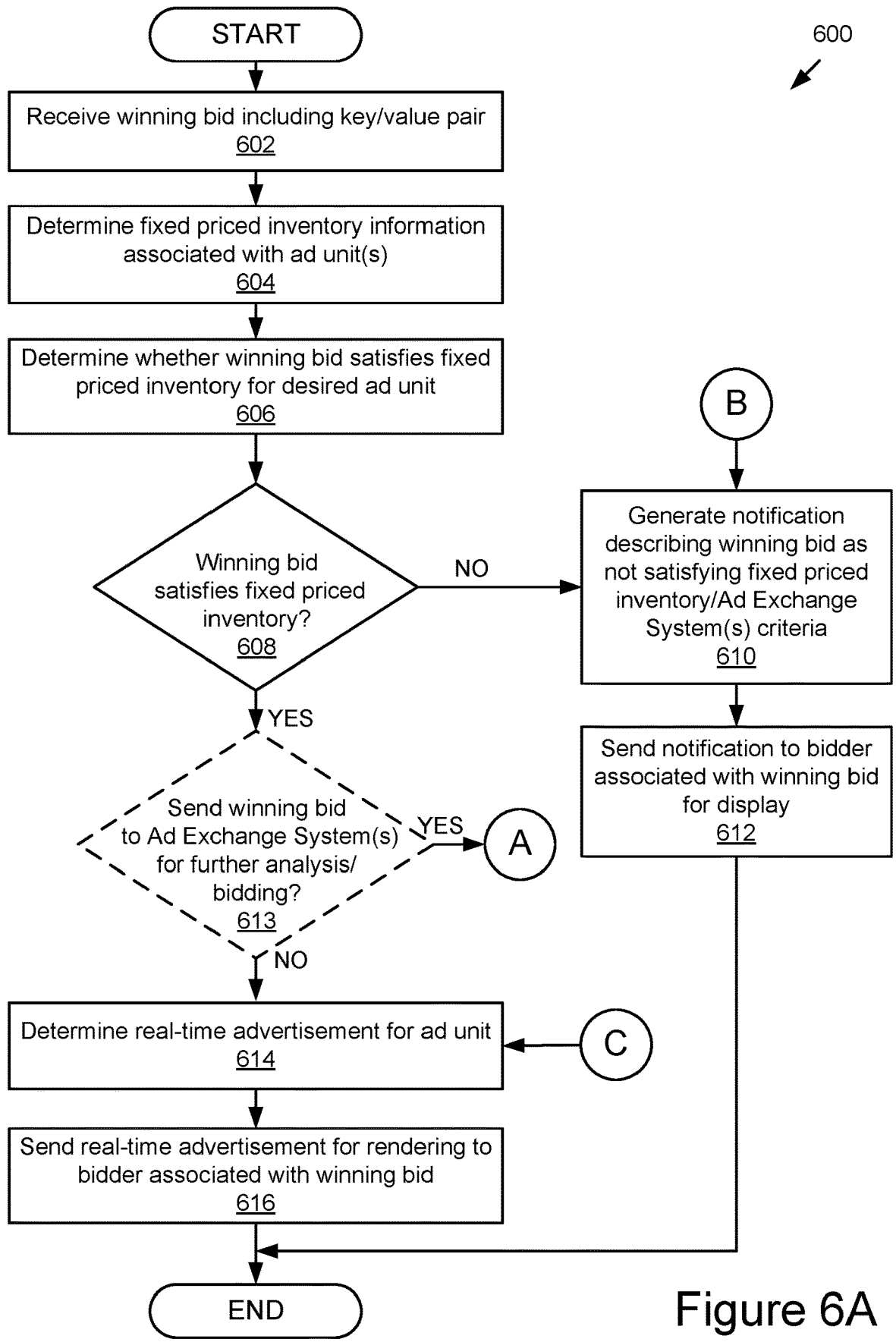
FIGS. 6A-6B is a flowchart of an example method illustrating the processing operations at the advertisement serving system.
Figure 6B:
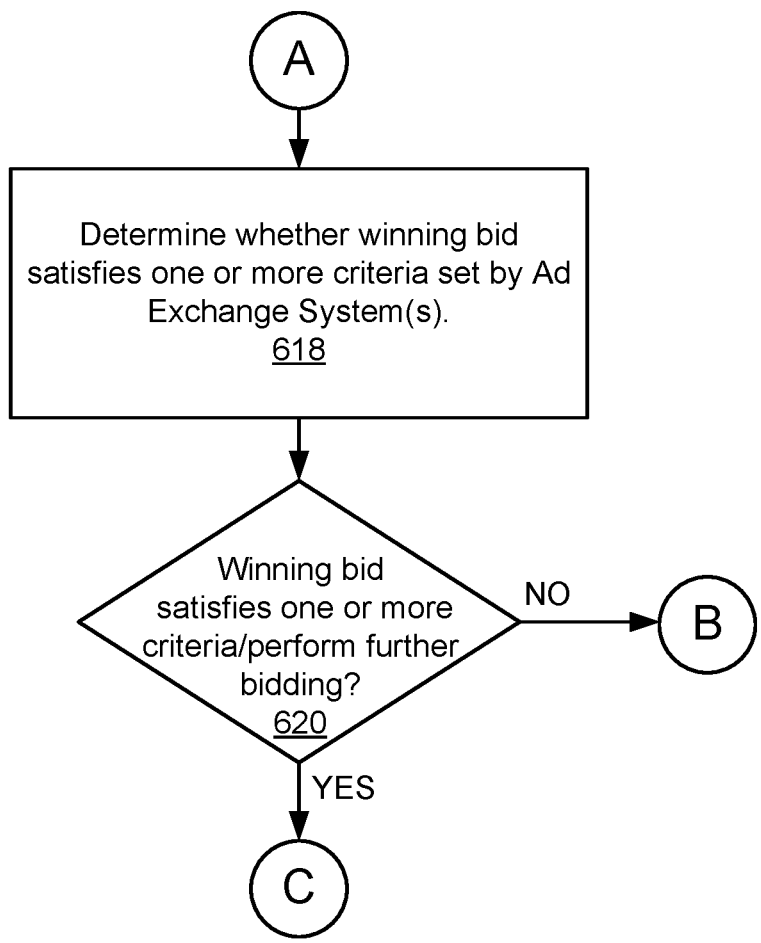

Referring now to FIGS. 6A-6B, the processing operations at the Advertisement Serving System 110 are described. The process 600 begins (in FIG. 6A) and proceeds to block 602 for receiving winning bids including a key/value pair. The process 600 proceeds to the next block 604 including one or more operations for determining the fixed price inventory information associated with each advertisement unit. The process 600 proceeds to the next block 606 including one or more operations for determining whether the winning bid satisfies fixed priced inventory for desired advertisement units. From there, the process 600 proceeds to the next decision block 608 including one or more operations for determining if a winning bid satisfies the fixed priced inventory. If the answer is negative, the process proceeds to the next block 610 including one or more operations for generating notifications describing winning bids as not satisfying fixed prices inventory. From there, the process 600 proceeds to the next block 612 including one or more operations for sending a notification to a bidder associated with the winning bid for display and then continues to an end. If the answer at the decision block 608 is affirmative, the process 600 proceeds to the next decision block 613 (shown in broken lines, as in some implementations, this process may be omitted) including one or more operations for sending the winning bid to the one or more Ad Exchanges 138 for further analysis or for further bidding. If the answer is affirmative, the process 600 proceeds via connector "A" to the next block 618 (in FIG. 6B) including one or more operations for determining whether the winning bid satisfies one or more criteria set by the one or more Ad Exchange Systems 138. From there, the process proceeds to the next decision block 620 (in FIG. 6B) to determine whether the winning bid satisfies one or more criteria or to perform further bidding. If the answer is negative, the process 600 proceeds via connector "B" to block 610 (in FIG. 6A). If the answer is affirmative, the process 600 proceeds via connector "C" to the next block 614.

If the answer at block 613 is negative, the process 600 proceeds to the next block 614 including one or more operations for determining real-time advertisements for advertisement units. The process 600 continues to the next block 616 including one or more operations for sending real-time advertisements for rendering to bidders associated with the winning bid. From there, the process proceeds to the end.

Figure 7:
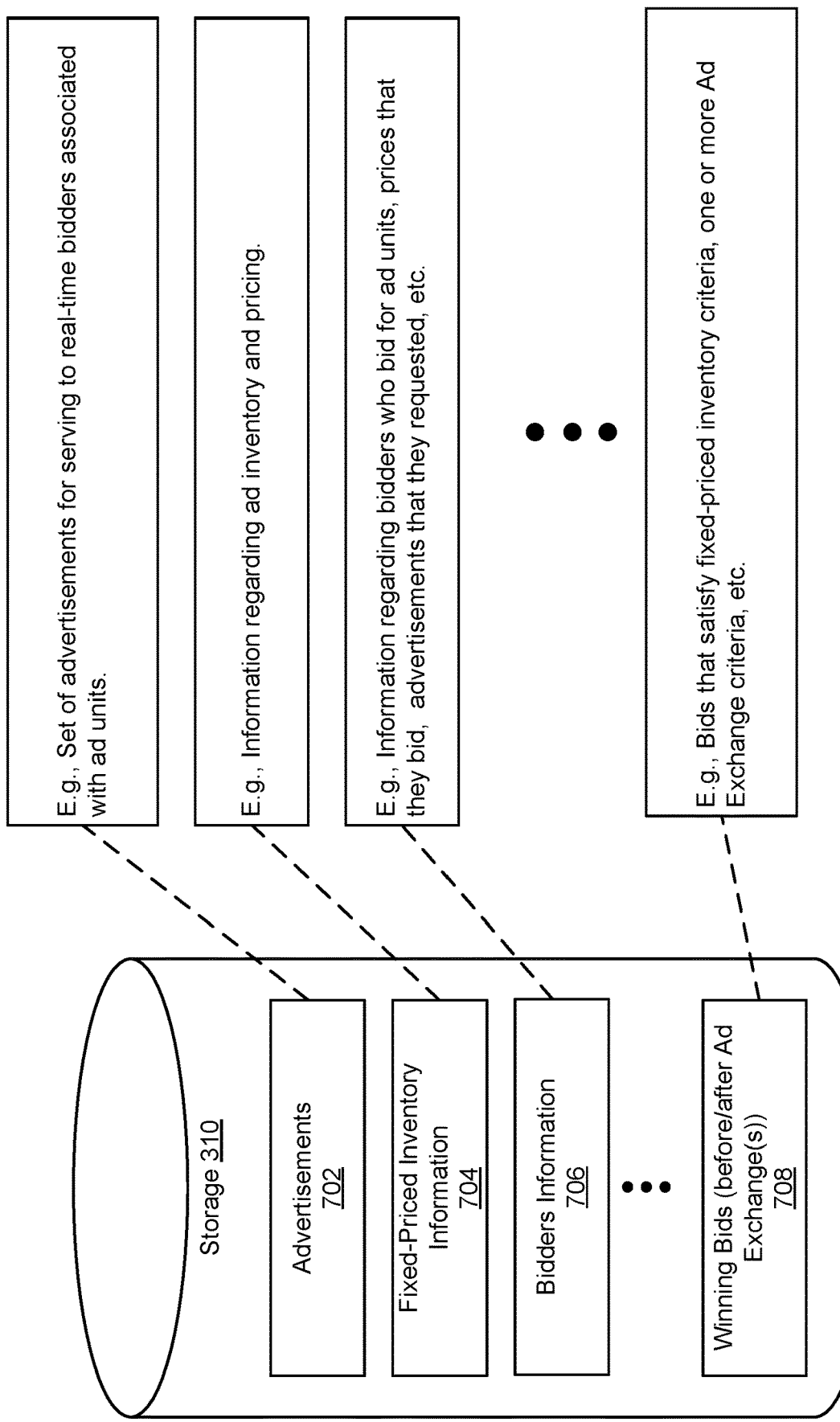
FIG. 7 is a block diagram illustrating data storage configurations in accordance with some embodiments of the present invention.

Referring now to FIG. 7, the data storage 310 is illustrated in greater detail. The storage 310 has memory sectors for storing advertisements 702, Fixed-Price Inventory Information 704, Bidders Information 706, and Winning Bids 708, among other data. As examples, the memory sector 702 may store a set of advertisements for serving to real-time bidders associated with advertisement units. The memory sector 704 for Fixed-Priced Inventory Information may include information on advertisement inventory and pricing. The memory sector 706 for Bidders Information may include as examples, information regarding bidders who bid for advertisement units, prices that the bid, advertisements that they requested etc. The memory sector 708 for Winning Bids (before or after one or more Ad Exchanges analysis) may include as examples, bids that satisfy fixed-priced inventory criteria, bids that satisfy one or more Ad Exchange criteria, etc. The examples illustrated here are only by way of example and it should be recognized that additional memory sections with additional data may be stored as needed or desired, depending upon the architectural implementations.

Figure 8:
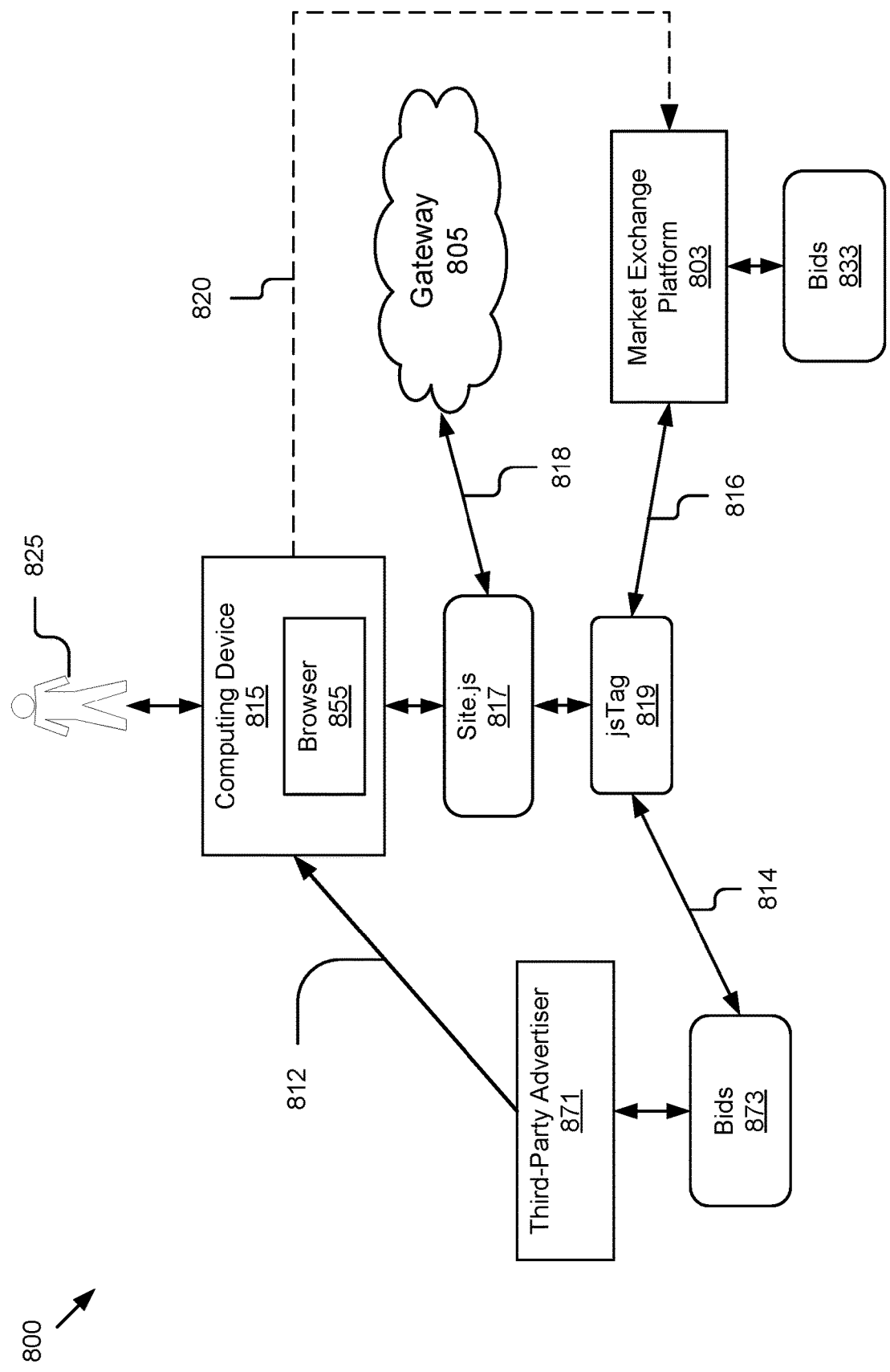
FIG. 8 is a block diagram 5 illustrates a block diagram of an exemplary client-side real-time auction environment with an illustration of inserting a code.

Referring now to FIG. 8, in operation, this integrated architecture for client-side real-time auctions is configured for use by those publishers who use third-party ad serving platforms designed for both small and large publishers. The system illustrated may use a computing device 815, with browser 855 in communication with a Site.js 817, which is coupled to a Gateway 805 by signal line 818. The computing device 815 is illustrated in communication (with broken lines 820) with a market exchange platform 803 for considering bids 873. A third-party advertiser 871 considers bids indicated by reference numeral 873. The market exchange platform 803 is in communication with jsTag 819, via line 816, and the third-party advertiser is in communication with the computing device 815, via line 812.

In some implementations, these large platforms may be configured with all non-guaranteed campaigns set to compete based on a price threshold. Publishers may use page implementation operations that include replacing tags or code placed by conventional third-party ad serving platforms on their webpages (on Site.js 817), with new tags or code 819, for example, referred to as a "LiftTag." This permits any particular third-party platform utilizing the present technology to interrupt the ad request before sending it to other third-party ad serving platforms.

For page implementation, publishers may replace their conventional page tags with a "LiftTag." This is to divert a particular "ad request" before sending it to a conventional platform. The present technology uses key value targeting to pass the "Market bid" price from a particular third-party platform into another third-party platform. An appropriate number of key values should be used to target to make sure that all the information is properly forwarded. In some implementations, eight out of twenty may be used. In some instances, in the event publishers are migrated from conventional platforms, they have customized multi-part zones that may require customization in order to work properly. In addition, multi-size ad requests require special assessment.

In operation, at the user interface, a user 825 may land on a particular web page, at which point an Ad request is sent to a particular first third-party platform (e.g., Third-Party Advertiser 871). A winning bid is sent back to user's browser 855. A winning bid price is triggered in another second third-party platform (another Third-Party Advertiser 871) by calling a campaign with a key value. The second third-party platform runs selection and its house auction. If the first third-party platform wins, it renders the advertisement and fires the impression beacon.

For system operation, the publisher may retag their page and include the javascript files in their page header. The publisher may provide this system architecture (e.g. the first platform) API access to another third-party platform. The first platform runs a setup script that mirrors their inventory setup in the each of the real-time bidders' platforms. The technology in the first platform runs another script that creates an order in the second platform with campaigns for each price bucket. The technology (first platform) creates a configuration file that is stored on an internet traffic reporting website with inventory mapping for that site.

When this technology serves an advertisement, it is difficult to measure when a particular third-party platform wins, and another one loses. The third-party platforms are not configured to send an impression beacon in such instances, and when a particular platform attempts to fire a late impression beacon on the client-side, some percentage is lost. In such instances, the lost-to-another platform rate is indicated as "unbillable".

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment.

What is claimed is:

1. A method comprising:
   in a first server operatively coupled by a network to a second server providing viewable content with at least one advertisement space on at least one web page of a website to a client device when the client device accesses the website and remote multiple real-time platforms, the first server comprising a data processor operatively coupled to the network and memory operatively associated with the data processor, the memory storing first executable code, the data processor configured by the first executable code to execute one or more actions via a web- based interface via the network to:
   execute second executable code associated with the web page to initiate an action in an instance that the web page is rendered for viewing on the client device, the second executable code executing particular code configured to initiate a communication for an advertisement request to fill the at least one advertisement space, executing the communication transmitted via a predetermined location to simultaneously trigger transmission of multiple parallel requests to remote multiple real-time platforms in real time to query for responsive bid data for digital media for each advertisement space on the web page;
   designate a predetermined period of time for receiving the responsive bid data or for lapsing;
   process key-value data describing a selected bid based on the responsive bid data, the key-value data providing a unique key that designates a bidder name and a value that identifies a bid amount for the selected bid, the unique key also indicating identification data including an order and a size usable for advertisement placement on the web page; and
   send the selected bid and the key-value data for each of the advertisement spaces to an advertisement server for processing, the key-value data usable by the advertisement server to serve an advertisement to fill the at least one advertisement space.

2. The method of claim 1, further comprising:
   in the first server, the second executable code placed by action of a particular publisher.

3. The method of claim 1, further comprising:
creating and storing by a first one of the remote multiple real-time platforms, a configuration file on an internet traffic reporting website with ad inventory mapping data for that website.

4. The method of claim 1, further comprising:
by a publisher action via the second server, retag the web page and insert an executable file in a header region of the web page.

5. The method of claim 4, further comprising:
providing the second executable code within the executable file in the header region of the web page.

6. The method of claim 1, further comprising:
in the first server, determining, by said data processor, the selected bid upon receiving all of the responsive bid data in real time or upon lapse of the predetermined time period.

7. The method of claim 1, further comprising:
in the first server, determining, by said data processor, in an instance in which the selected bid satisfies a minimum threshold for a user segment indicated by including a segmentation data pixel, and retrieve the segmentation data pixel and update the segmentations data pixel in a particular format.

8. The method of claim 1, further comprising:
in the first server, generating, by the data processor, an indicator for the selected bid, on at least one of the provider's data and real-time information associated with the selected bid.

9. The method of claim 1, further comprising:
in the first server, aggregating, by the data processor, related data for the selected bid including at least one of user segmentation data, historical data, and current pricing data.

10. The method of claim 1, further comprising:
in the first server, generating, by at least the data processor, a report including threshold information.

11. A system comprising:
a first server configured to operatively communicate with a second server providing viewable content with an advertisement unit on a web page of a website to a client device and remote real-time platforms, the first server comprising a data processor and memory with stored instructions containing first executable code that cause said data processor to execute one or more actions via a web-based interface via a network to:
in the first server, executing, second executable code associated with the web page and configured to initiate an action in an instance that the web page is rendered for viewing on the client device, the second executable code executing particular code configured to initiate an advertisement request to trigger multiple parallel requests to the remote real-time platforms coupled over said network in real time to query digital media for each advertisement unit on the web page;
in the first server, designate a predetermined period of time for receiving responsive bid data to the multiple parallel requests, the data processor configured to receive responsive bid data in real time from the remote real-time platforms for the advertisement unit; and
in the first server, the data processor configured to process key-value data describing a selected bid based on the responsive bid data, the key-value data providing a unique key that designates a bidder name and a value that identifies a bid amount for the selected bid, the unique key also indicating identification data including an order and a size usable for advertisement placement on the web page and send the selected bid and the key-value data for the advertisement unit to an advertisement server for processing, the key-value data usable by the advertisement server to provide an advertisement to fill the advertisement unit.

12. The system of claim 11, wherein the instructions stored in the memory containing the first executable code further causes the data processor to:
place in the first server, the second executable code by action of a particular publisher.

13. The system of claim 11, wherein the instructions stored in the memory containing the second executable code further causes the data processor to:
create and store a configuration file by a first one of the remote real-time platforms on an internet traffic reporting website with inventory mapping for that website.

14. The system of claim 11, wherein by a publisher action by the second executable code retags the web page and includes a file in a header of the web page.

15. The system of claim 14, wherein the second executable code is provided within an executable file in the header region of the web page.

16. The system of claim 11, wherein said data processor determines a data result output upon receiving all of multiple data responsive inputs in real time or upon lapse of a predetermined time period.

17. The system of claim 11, wherein the instructions stored in the memory containing executable code further causes the data processor to:
determine an instance in which the selected bid satisfies a minimum threshold for a user segment indicated by including a segmentation data pixel, and retrieve the segmentation data pixel and update the segmentation data pixel in a particular format.

18. The system of claim 11, wherein the instructions stored in the memory containing executable code further cause the data processor to:
generate an indicator for the selected bid on at least one of the provider's data and real-time information associated with the selected bid.

19. The system of claim 11, wherein the instructions stored in the memory containing executable code further cause the data processor to:
aggregate related data for the selected bid including at least one of user segmentation data, historical data, and current pricing data.

20. The system of claim 11 wherein the instructions stored in the memory containing executable code further cause the data processor to:
generate a report including threshold information.

* * * * *